(12) United States Patent
Nevatia et al.

(10) Patent No.: US 11,115,421 B2
(45) Date of Patent: Sep. 7, 2021

(54) SECURITY MONITORING PLATFORM FOR MANAGING ACCESS RIGHTS ASSOCIATED WITH CLOUD APPLICATIONS

(71) Applicant: Accenture Global Solutions Limited, Dublin (IE)

(72) Inventors: Dayapatra Nevatia, Bangalore (IN); Ravishankar Krishnan, Bangalore (IN); Ravi Shankar Nori, Bangalore (IN); Paresh Vinay Takawale, Pune (IN); Mukul Dilip Patidar, Pune (IN); Garima Mittal, Pune (IN)

(73) Assignee: Accenture Global Solutions Limited, Dublin (IE)

( * ) Notice: Subject to any disclaimer, the term of this patent is extended or adjusted under 35 U.S.C. 154(b) by 295 days.

(21) Appl. No.: 16/453,696

(22) Filed: Jun. 26, 2019

(65) Prior Publication Data
US 2020/0412726 A1 Dec. 31, 2020

(51) Int. Cl.
*H04L 29/06* (2006.01)
*G06N 20/00* (2019.01)

(52) U.S. Cl.
CPC .......... *H04L 63/102* (2013.01); *G06N 20/00* (2019.01)

(58) Field of Classification Search
None
See application file for complete search history.

(56) References Cited

U.S. PATENT DOCUMENTS

| 2006/0277184 A1 | 12/2006 | Faitelson et al. |
| 2012/0246098 A1 | 9/2012 | Chari et al. |
| 2018/0248889 A1 | 8/2018 | Deninno et al. |

FOREIGN PATENT DOCUMENTS

WO 0214987 A2 2/2002

OTHER PUBLICATIONS

Co-pending U.S. Appl. No. 15/900,475, entitled "A System for Controlling Access to a Plurality of Target Systems and Applications," by Rexall E. Thexton et al., filed Feb. 20, 2018, 35 pages.
Co-pending U.S. Appl. No. 16/016,154, entitled "A System for Controlling Access to a Plurality of Target Systems and Applications," by Rexall E. Thexton et al., filed Jun. 22, 2018, 39 pages.
Extended European Search Report for Application No. EP20158110.5, dated Aug. 21, 2020, 6 pages.

*Primary Examiner* — Cai Y Chen
(74) *Attorney, Agent, or Firm* — Harrity & Harrity, LLP

(57) ABSTRACT

A security monitoring platform may use an unsupervised machine learning technique to cluster historical data related to user access rights associated with multiple cloud applications based on various features that relate to user permissions and attributes within the multiple cloud applications. The security monitoring platform may use a supervised machine learning technique to train an access rights data model based on the clustered historical data and perform one or more actions that relate to current access rights assigned to at least one user within one or more of the multiple cloud applications based on a score representing a probability that an access level assigned to the at least one user within the one or more of the multiple cloud applications is correct. The security monitoring platform may apply a reinforcement learning technique to update the access rights data model based on feedback related to the one or more actions.

20 Claims, 8 Drawing Sheets

SECURITY MONITORING PLATFORM FOR MANAGING ACCESS RIGHTS ASSOCIATED WITH CLOUD APPLICATIONS

BACKGROUND

Different types of machine learning algorithms are associated with different types of data input and output and/or with different types of tasks or problems. One machine learning algorithm is an unsupervised machine learning algorithm where a model is constructed from a set of data that contains only inputs. Another machine learning algorithm is a supervised, or semi-supervised, machine learning algorithm where a model is constructed from a set of data that contains both a set of inputs and a set of corresponding outputs. Another machine learning algorithm is a reinforcement learning algorithm where software agents are configured to take actions in an environment so as to maximize some notion of a cumulative reward.

SUMMARY

According to some implementations, a method may include receiving historical data that relates to user access rights associated with multiple cloud applications, wherein the historical data includes features that relate to permissions and attributes associated with multiple users within the multiple cloud applications; using an unsupervised machine learning technique to cluster the historical data based on the features that relate to the permissions and the attributes associated with the multiple users within the multiple cloud applications; using a supervised machine learning technique to train an access rights data model based on the clustered historical data; performing one or more actions that relate to current access rights assigned to at least one user within one or more of the multiple cloud applications based on a score representing a probability that an access level assigned to the at least one user within the one or more of the multiple cloud applications is correct, wherein the score is determined based on the access rights data model and a set of features that relate to the at least one user; and applying a reinforcement learning technique to update the access rights data model based on data providing feedback on the one or more actions.

According to some implementations, a device may include one or more memories; and one or more processors communicatively coupled to the one or more memories. The one or more processors may be configured to: obtain an access rights data model that is trained based on historical data that includes information related to permissions and attributes associated with multiple users within at least one cloud application; obtain, from the at least one cloud application, information that relates to current access rights assigned to at least one user within the at least one cloud application; determine a probability that an access level assigned to the at least one user within the at least one cloud application is correct based on the access rights data model and a set of features that relate to the at least one user; perform one or more actions to modify the access level assigned to the at least one user based on the probability satisfying a threshold; and apply a reinforcement learning technique to update the access rights data model based on data that includes feedback on the one or more actions.

According to some implementations, a non-transitory computer-readable medium may store one or more instructions. The one or more instructions, when executed by one or more processors of a device, may cause the one or more processors to: obtain historical data that includes features related to permissions and attributes associated with multiple users within multiple cloud applications; train a data model using multiple machine learning techniques, wherein the multiple machine learning techniques include an unsupervised machine learning technique that partitions the features included in the historical data into multiple clusters based on a nearest mean associated with each feature, wherein the multiple machine learning techniques include a supervised machine learning technique that derives a mapping function from the features included in the historical data to the multiple clusters, and wherein the data model is based on the mapping function; determine a probability that a current access level assigned to at least one user within at least one of the multiple cloud applications is correct based on the mapping function and one or more attributes associated with the at least one user; perform one or more actions to implement a modification to the current access level assigned to the at least one user based on the probability satisfying a threshold; receive feedback indicating whether the modification to the current access level is approved, revised, or rejected; and apply a reinforcement learning technique to update the mapping function associated with the data model based on the feedback.

DETAILED DESCRIPTION

Figure 1A:
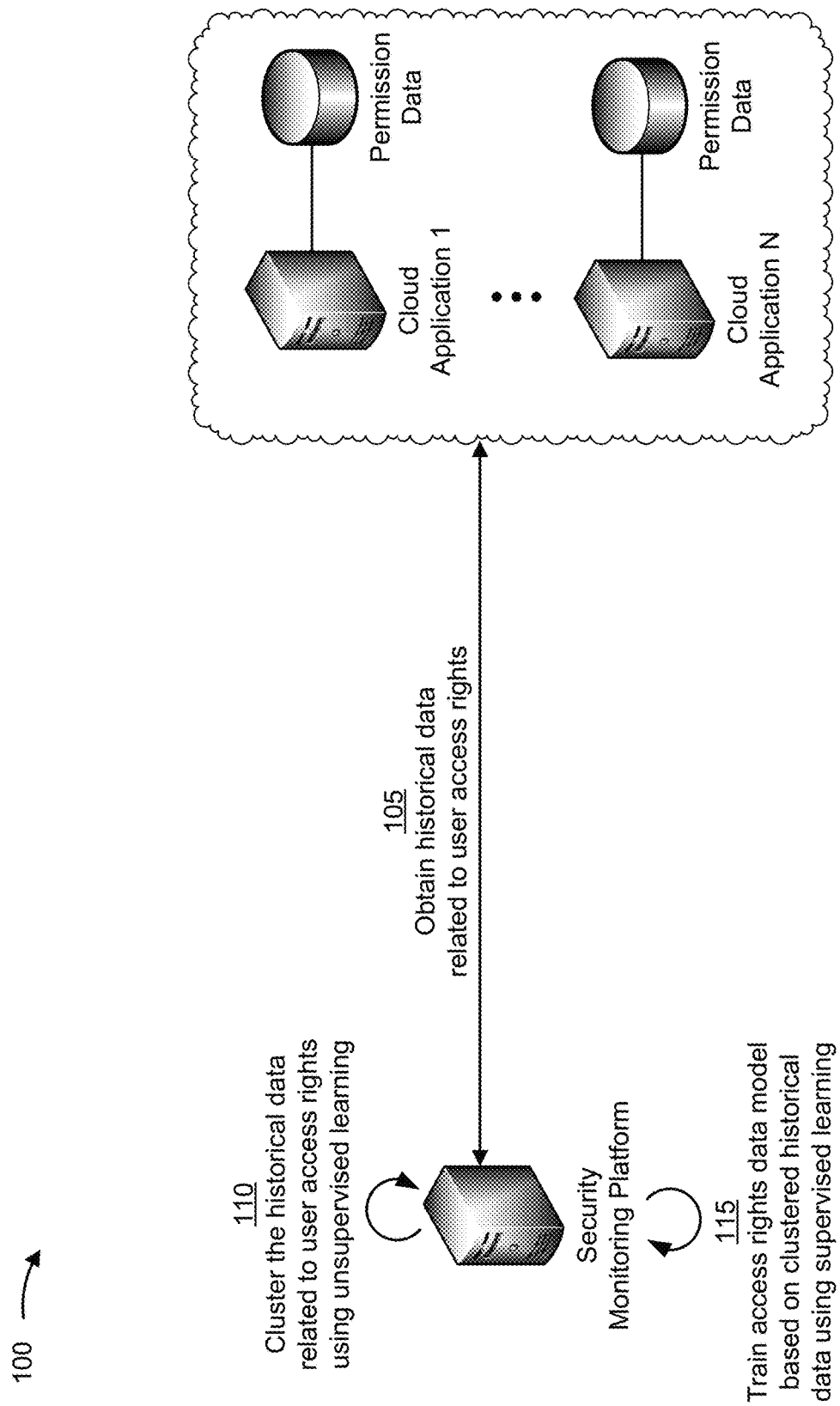
FIGS. 1A-1C are diagrams of one or more example implementations described herein.

The following detailed description of example implementations refers to the accompanying drawings. The same reference numbers in different drawings can identify the same or similar elements.

In information security, access control refers to security techniques that are implemented to regulate who and/or what can view, use, control, or otherwise access resources in a computing environment. The goal of access control is generally to minimize risks that may result from unauthorized access to resources in the computing environment. Access control is a fundamental component of security compliance programs and is typically used to ensure that security technology, policies, and/or the like are in place to protect sensitive or confidential information, such as customer data, personally identifiable information, intellectual property, and/or the like. However, access control systems are often complex and can be particularly challenging to manage in dynamic information technology environments, such as environments that involve cloud services, which have various characteristics that differ from typical information technology environments.

For example, cloud applications execute on virtualized hardware and a software stack that can be moved and replicated between physical machines as needed. Furthermore, cloud applications typically share common physical resources with other cloud applications, are built to be highly scalable in real-time, and are predominately accessed using standard network protocols. Accordingly, because cloud applications execute on hardware that is controlled by a cloud provider and usually share resources and infrastructure with other cloud applications, cloud applications are often deployed using a multi-layered security architecture that combines several security measures to address issues related to access control, data privacy, and/or the like. For example, a multi-layered security architecture may combine different security protocols related to encryption, firewalls, intrusion prevention, intrusion detection, whitelisting, authentication, and/or the like at a system level, an application level, a transmission level, and/or the like to prevent data in use as well as data at rest. Accordingly, due to the complexity and possible fragmentation of the different security protocols that are used to protect cloud applications, various challenges arise when handling access controls for cloud applications.

For example, when implementing access control systems in a cloud computing environment, one challenge that may arise relates to an inability or difficulty to obtain details relating to users that have critical access. Furthermore, multi-layered security architectures may raise difficulties with respect to understanding individual access levels. In another example, incorrect access levels may lead to users making unauthorized system changes. Accordingly, the challenges of implementing access controls in a cloud computing environment may create a risk of a data breach, which could lead to a loss of customer data, personally identifiable information, confidential product and/or pricing information, and/or the like. Furthermore, a lack of role-based access, access by offboarded users, and/or the like may create a risk of non-compliance to industry standards, and faulty access control may result in incorrect changes to functionality and/or system capabilities, inappropriate modification and/or deletion of data, and/or the like.

Some implementations described herein provide a security monitoring platform that can utilize various artificial intelligence or machine learning techniques to model user access rights across multiple cloud applications and to automatically initiate actions to remediate discrepancies in user access levels (e.g., revoking, modifying, and/or elevating the access rights assigned to a particular user when current access rights assigned to the user differ from predicted or expected access rights that are based on certain attributes associated with the user). More particularly, according to some implementations, the security monitoring platform may utilize a combination of unsupervised learning, supervised learning, and reinforced learning to flag security anomalies in cloud applications, make decisions to modify access controls or permissions associated with one or more users, apply exploration and/or exploitation techniques to generate and learn from feedback on the decisions, and/or the like.

For example, in some implementations, the security monitoring platform may use one or more extract, transform, and load (ETL) tools to obtain historical data related to user access rights from a set of cloud applications, and the historical data obtained from the set of cloud applications may be partitioned into clusters using an unsupervised machine learning technique. The security monitoring platform may train an access rights data model using a supervised machine learning technique that derives a mapping function from a set of inputs (e.g., user permissions and/or attributes contained in the historical data) to a set of outputs (e.g., a particular cluster representing the correct access level). In some implementations, a correct access level for a particular user may be predicted based on the access rights data model, and one or more actions to modify current access rights assigned to the particular user based on an anomaly between the correct access level that was predicted based on the access rights data model and the current access rights assigned to the particular user. Furthermore, the security monitoring platform may receive feedback on the one or more actions and apply a reinforcement learning technique to learn from the feedback and make better decisions in the future.

In this way, the security monitoring platform enables simplified user access management, enables rules for determining critical access to be automatically tailored and/or reconciled, and provides a consistent and documented mechanism to respond to audit queries from internal security teams and client security teams. Furthermore, by ensuring that users have a correct access level, which may involve revoking access rights granted to certain users that have been granted excessive authority, elevating access rights assigned to certain users that require critical access to fulfill a role within an organization, and/or the like, the security monitoring platform reduces security risks that may arise due to incorrect access levels. Accordingly, the security monitoring platform conserves computing resources, network resources, and/or the like that would otherwise be wasted and/or consumed responding to requests to elevate access rights for certain users, remediating security breaches for users that have excessive access rights, gathering and analyzing data to track compliance issues and/or respond to audit inquiries, and/or the like.

Figure 1B:
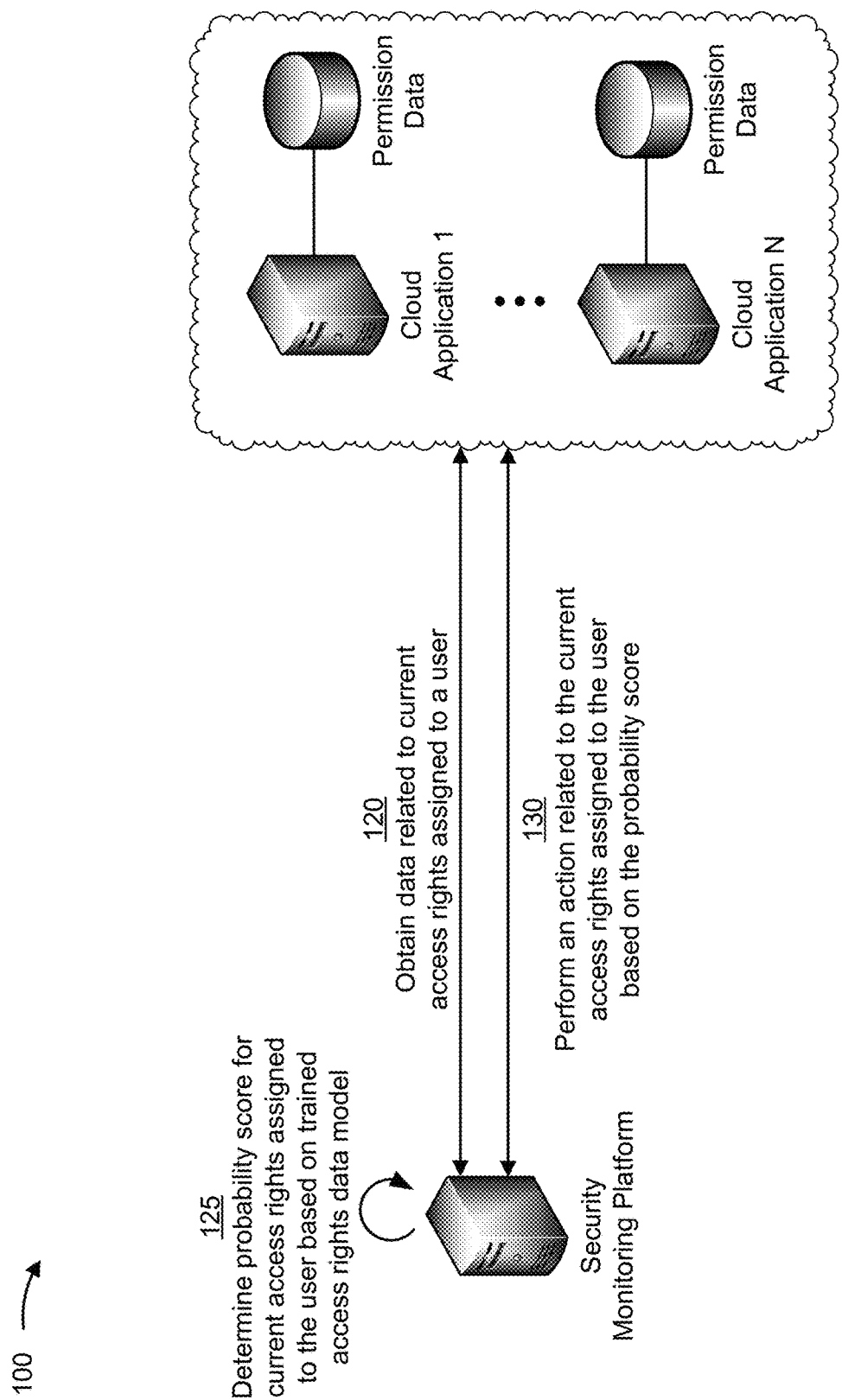
Figure 1C:
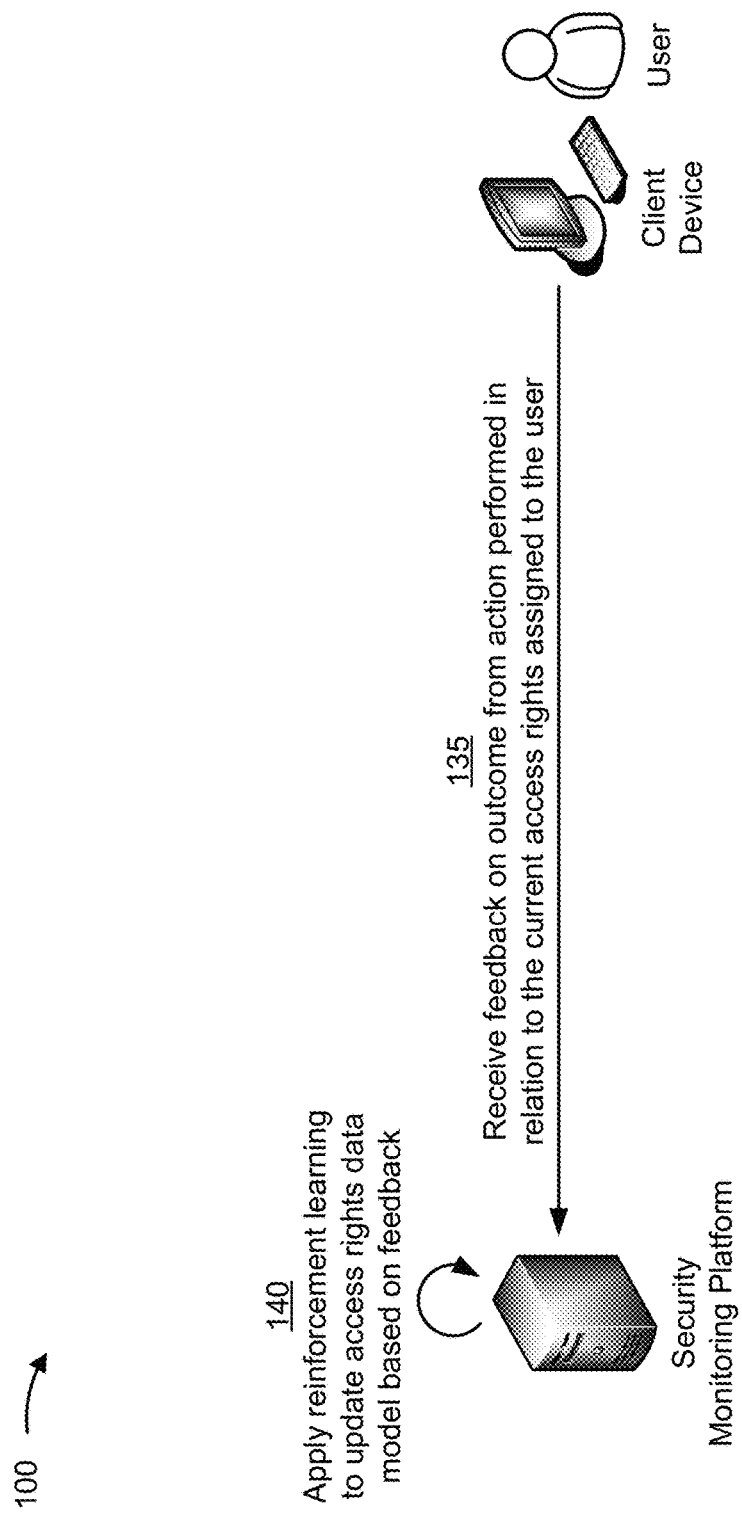

FIGS. 1A-1C are diagrams of one or more example implementations 100 described herein. As shown in FIGS. 1A-1C, example implementation(s) 100 may include a set of cloud applications that may be associated with permissions data to define access rights that various users have within the respective cloud applications, a security monitoring platform that may apply a combination of unsupervised learning and supervised learning techniques to train an access rights data model based on historical data that includes features related to permissions and attributes associated with the various users within the set of cloud applications, and a client device that may be operated by one or more users that are authorized to oversee, modify, or otherwise manage the access rights that the various users have within the set of cloud applications. Accordingly, when the security monitoring platform performs an automated action to modify the access rights associated with a particular user (e.g., based on the access rights data model indicating that there may be an anomaly between the actual access rights assigned to the user and the access rights that the user is expected to have), the security monitoring platform may receive feedback on the automated action (e.g., from the user(s) operating the client device) and apply a reinforcement learning technique to revise the access rights data model as needed to improve the accuracy of future predictions.

As shown in FIG. 1A, and by reference number 105, the security monitoring platform may obtain historical data related to user access rights from the set of cloud applications. As shown in FIG. 1A, each cloud application may include or otherwise be associated with permissions data that define certain access rights that have historically been assigned or otherwise granted to various users, and the security monitoring platform may use one or more extract, transform, and load (ETL) tools to obtain the permissions data from the cloud applications. In some implementations, the permissions data may be defined according to an attribute-based access control (ABAC) scheme, a policy-based access control (PBAC) scheme, and/or the like, whereby certain access rights are granted to users through the use of policies that are dependent on a set of attributes. For example, the attributes can be used to describe users (e.g., a name, role, clearance level, job title, organization, department, and/or the like), resources (e.g., a data type, sensitivity level, classification, and/or the like), contexts (e.g., a location, time, and/or the like), actions (e.g., read, delete, modify, view, and/or the like), and/or the like. Accordingly, in an ABAC scheme, a PBAC scheme, and/or the like, policies can be defined to control access to resources based on certain combinations of attributes (e.g., users that have a system administrator role may be allowed read/write access to sensitive resources). Additionally, or alternatively, the permissions data may be defined according to a role-based access control (RBAC) scheme that assigns a set of permissions to a particular user based on a particular role associated with the user.

In some implementations, the historical data obtained from the cloud applications may include sensitive data (e.g., confidential information, personally identifiable information, and/or the like). Accordingly, the historical data may be encrypted using public key cryptography, asymmetric cryptography, and/or the like to protect the historical data from unauthorized access. For example, in some implementations, the historical data may be encrypted using a public key associated with the security monitoring platform prior to providing the historical data to the security monitoring platform, and the security monitoring platform may decrypt the historical data using a private key that is securely maintained by the security monitoring platform (e.g., in a secure element). In this way, the historical data obtained from the cloud applications may be secured while in-transit to the security monitoring platform.

In some implementations, the historical data obtained from the cloud applications may have different formats, may be expressed using different access control schemes, and/or the like, whereby the security monitoring platform may use the ETL tool(s) to transform the historical data obtained from the cloud applications into a common format. For example, in some implementations, the security monitoring platform may perform a data preprocessing operation to remove non-ASCII characters, white spaces, confidential data, personally identifiable information, and/or the like to organize thousands, millions, or billions of data entries for machine learning and model generation. Furthermore, in some implementations, the security monitoring platform may transform the preprocessed historical data into a tabular format that represents the permissions data, the attributes associated with the users of the cloud applications, and/or the like according to one or more feature sets. Each feature set may generally include a set of one or more related features that represent attributes associated with a particular user and/or one or more permissions and/or access rights that are assigned to the particular user within one or more of the cloud applications.

For example, in some implementations, a feature set may include a value for a role (e.g., senior engineer, sales representative, guest user, and/or the like), an organization identifier, a clearance level, an access level (e.g., system administrator, sales profile, guest profile, and/or the like), a set of permissions (e.g., read only, edit, modify all, delete, and/or the like), and/or the like. In some cases, where different cloud applications use different syntactic rules to represent certain attributes that are the same or substantially similar, the security monitoring platform may transform the different attributes into a common form (e.g., the string "system administrator" may be normalized to "sysadmin", equivalent permissions such as "edit" and "modify all" may be normalized to a common form, and/or the like). In this way, the security monitoring platform may transform different syntactic representations of attributes and/or permissions that are semantically equivalent into a common format to enable subsequent training of one or more machine learning models, as described in further detail elsewhere herein.

In some implementations, the security monitoring platform may preprocess and/or perform dimensionality reduction on an initial set of raw features in the historical data obtained from the cloud applications to reduce the historical data to a minimum feature set, and the one or more machine learning models may then be trained on this minimum feature set, thereby reducing processing to train the machine learning model. For example, the security monitoring platform may perform the dimensionality reduction using a principal component analysis technique to determine a linear mapping of the historical data to a lower-dimensional space, using a non-negative matrix factorization to decompose a non-negative matrix to a product of two non-negative matrices, and/or the like. Additionally, or alternatively, the security monitoring platform may perform feature hashing to transform the historical data into numeric values to enable certain machine learning algorithms that may depend on having a numeric representation of data to facilitate processing and statistical analysis. For example, in some implementations, the security monitoring platform may input each feature to a one-way hash function, and the resultant hash values may be used in the feature vectors that are analyzed using the machine learning algorithms described in further detail elsewhere herein. In this way, the feature hashing may vectorize non-numeric data in a fast and space-efficient manner, which conserves memory resources by reducing the amount of data to be stored, conserves processing resources by representing data in a form that can be directly analyzed (e.g., without having to perform a lookup in an associative array), and/or the like.

As further shown in FIG. 1A, and by reference number 110, the security monitoring platform may cluster the historical data related to user access rights using an unsupervised machine learning technique. In particular, the unsupervised machine learning technique may generally be used to partition the features included in the historical data into multiple clusters based on a nearest mean associated with each feature. For example, in some implementations, the unsupervised machine learning technique may include a k-means clustering technique, which aims to partition n observations into k clusters in which each observation belongs to a cluster with a nearest mean, serving as a prototype of the cluster. Accordingly, assuming that the historical data obtained from the cloud applications includes one or more features that relate to permissions and/or attributes associated with various users within the cloud applications, the security monitoring platform may cluster the historical data by placing the features into groups such that the features placed into a particular cluster are considered more "similar" to one another than to features that are placed into other clusters. For example, as mentioned above, the security monitoring platform may perform k-means clustering on the historical data, which may involve seeking a minimum variance data grouping that minimizes the sum of squared Euclidean distances from certain cluster centroids that can represent proxies to replace or otherwise re-express the original features placed into the clusters.

In some implementations, the k-means clustering performed by the security monitoring platform may include an initialization step in which k starting points are selected randomly or according to some heuristic, a distance calculation step in which a Euclidean distance to each cluster centroid may be computed for each feature such that each feature can be assigned to a closest cluster centroid, a centroid recalculation step in which each cluster centroid may be recalculated according to the average features assigned thereto, and a convergence step in which the initialization, distance calculation, and centroid recalculation steps are repeated until a convergence condition has been satisfied. Accordingly, clustering the historical data may partition the historical data into clusters that can each symbolize multiple features that are similar, related, and/or the like, thereby compressing the original data set and conserving memory resources because the cluster centroids can effectively replace or otherwise re-express many original data items contained in the historical data obtained from the cloud applications.

In general, by clustering the historical data using the unsupervised learning technique, which may include a k-means clustering technique as described above and/or another suitable clustering technique (e.g., hierarchical clustering, distribution model-based clustering, neural model-based clustering, and/or the like), the security monitoring platform may generate inferences related to the permissions and attributes associated with users within the cloud applications using only input vectors without reference to known (or labelled) outcomes. Accordingly, by using clusters to group similar data points (or features), the security monitoring platform may assign a label to each cluster (e.g., using domain knowledge related to the historical data) to create training data that can be used by one or more supervised machine learning techniques. For example, the clusters may group user attributes that may be related due to an association with equivalent and/or similar permissions, access levels, and/or the like, which may provide labels that can be associated with the grouped user attributes to enable subsequent training operations using one or more supervised machine learning techniques.

Additionally, or alternatively, the unsupervised learning technique that the security monitoring platform uses to cluster the historical data may be a decision tree model. For example, in some implementations, the decision tree model may use a decision tree data structure to perform unsupervised machine learning. The decision tree data structure may classify a population into branch-like segments that form an inverted tree with a root node, internal nodes, leaf nodes, and/or the like. For example, the decision tree learning model may use a decision tree as a predictive model to map observations about a data item (represented in the branches of the tree data structure) to conclusions about a target value for the data item (represented in the leaves of the tree data structure). The process of building a decision tree may include partitioning the historical data set into subsets, shortening branches of the tree, and selecting a tree (e.g., the smallest tree) that fits the data. In some implementations, the decision tree model may be a classification tree (where the target variable can take a discrete set of values) in which leaves represent class labels and branches represent conjunctions of features that lead to those class labels. Additionally, or alternatively, the decision tree model may be a regression tree (where the target variable can take continuous values, such as real numbers).

As further shown in FIG. 1A, and by reference number 115, the security monitoring platform may use a supervised machine learning technique to train an access rights data model based on the historical data clustered using the unsupervised machine learning technique. For example, the security monitoring platform may train the access rights data model using information that includes a plurality of features included in the historical data that relate to permissions, attributes, and/or the like associated with various users within the cloud applications, a plurality of labels, outcomes, and/or the like associated with the clusters generated using the unsupervised machine learning technique, and/or the like, to approximate a mapping function from the features included in the historical data to the multiple clusters. As an example, the security monitoring platform may determine that certain historical attributes (e.g., a role of senior engineer, sales representative, and/or the like) are associated with a threshold probability of being associated with a critical access level that includes permissions to modify and/or delete data that has a high sensitivity rating. As another example, the security monitoring platform may determine that certain historical attributes (e.g., a role of guest user, an identifier of a third-party organization, and/or the like) are associated with a threshold probability of being associated with a restricted access level (e.g., read-only access with respect to data that has a low or medium sensitivity rating, no access to data that has a high sensitivity rating, and/or the like). In some implementations, the security monitoring platform may use a scoring system (e.g., with relatively high scores and/or relatively low scores) to identify and/or classify features included in the historical data as being associated with one another. In this case, the security monitoring platform may determine that a relatively high score is to be assigned to features that are determined to be the same and/or similar as previously identified features. In contrast, the security monitoring platform may determine that a relatively low score is to be assigned to features that are determined to be different than past identified features.

In some implementations, the security monitoring platform may use a classification technique, such as a naïve Bayes classification technique, to train the access rights data model. In this case, the security monitoring platform may perform binary recursive partitioning to split the data of the minimum feature set into partitions and/or branches and use the partitions and/or branches to perform predictions (e.g., whether an access level assigned to a particular user is correct or needs to be revoked, elevated, modified, or otherwise revised). Based on using recursive partitioning, the security monitoring platform may reduce utilization of computing resources relative to manual, linear sorting and analysis of data points, thereby enabling use of thousands, millions, or billions of data points to train the access rights data model, which may result in a more accurate access rights data model than using fewer data points.

For example, given a tabular representation of a training dataset, the security monitoring platform may partition the training dataset into a feature matrix and a response vector. The feature matrix may contain various feature vectors, and each feature vector may include values for one or more features (e.g., role, job title, organization identifier, department identifier, access level, permissions granted, and/or the like) that may be related to an authorization status for a particular user. The response vector may include a value for a class variable for each row of the feature matrix (e.g., an outcome or a prediction as to whether the user associated with the row is authorized to access a given resource, type of resource, and/or the like). Furthermore, the naïve Bayes classification technique may be based on a (naïve) assumption that each feature in the feature matrix makes an independent and equal contribution to the outcome represented by the response vector. Accordingly, the naïve Bayes classification technique may derive or approximate a mapping function that provides a probability of a given outcome (e.g., whether a user has authorized access to a resource) given one or more conditions (e.g., the values for the features associated with the corresponding feature vector).

In other examples, the classification technique used by the security monitoring platform may include logistic regression classification technique, a random forest classification technique, a gradient boosting machine learning (GBM) technique, and/or the like, to determine a categorical outcome (e.g., whether a user has authorized access to a resource). Additionally, or alternatively, the security monitoring platform may use a support vector machine (SVM) classifier technique to generate a non-linear boundary between data points in the training set. In this case, the non-linear boundary is used to classify test data into a particular class.

Additionally, or alternatively, the security monitoring platform may use one or more other model training techniques, such as a neural network technique, a latent semantic indexing technique, and/or the like. For example, the security monitoring platform may perform an artificial neural network processing technique (e.g., using a two-layer feedforward neural network architecture, a three-layer feedforward neural network architecture, and/or the like) to perform pattern recognition with regard to patterns in the clusters used to group the various features included in the historical data obtained from the cloud applications. In this case, using the artificial neural network processing technique may improve an accuracy of the access rights data model generated by the security monitoring platform by being more robust to noisy, imprecise, or incomplete data, and by enabling the security monitoring platform to detect patterns and/or trends undetectable to human analysts or systems using less complex techniques.

As example, the security monitoring platform may determine, using a linear regression technique, that a threshold percentage of features in a feature vector associated with a particular user are inconsistent with an access level, a set of permissions, and/or the like associated with the user, and may determine that those features are to receive relatively low association scores. In contrast, the security monitoring platform may determine that another threshold percentage of features in the feature vector are consistent with the access level, set of permissions, and/or the like associated with the user, and the security monitoring platform may assign a relatively high association score to those features. Accordingly, based on the mapping function that is approximated using the supervised machine learning technique, the security monitoring platform may generate the access rights data model and may use the access rights data model to analyze new user attributes, permissions, access levels, and/or the like that are input to or otherwise obtained by the security monitoring platform. Accordingly, in some implementations, the access rights data model may be a linear regression model that employs a linear approach to model a relationship between a scalar dependent variable (y) and one or more explanatory variables (or independent variables) denoted (X). The linear regression model may focus on a conditional probability distribution of (y) given (X). In the linear regression model, the relationships may be modeled using linear predictor functions (e.g., linear models) whose unknown model parameters are estimated from the data. In some implementations, the conditional mean of (y) given the value of (X) may be assumed to be an affine function of (X). Additionally, or alternatively, a median or another quantile of the conditional probability distribution of (y) given (X) may be expressed as a linear function of (X).

Although the foregoing description describes examples in which the security monitoring platform generates and/or trains the access rights data model, in some implementations, a different device other than the security monitoring platform, such as a server device, may generate and train the access rights data model. The different device may send the access rights data model for use by the security monitoring platform. The different device may update and send (e.g., on a scheduled basis, on an on-demand basis, on a triggered basis, on a periodic basis, and/or the like) the access rights data model to the security monitoring platform. Furthermore, in some implementations, the access rights data model may be re-trained based on one or more events (e.g., periodically, according to a schedule, based on receiving updated access rights data, based on a change in one or more policies that affect user access rights within the cloud applications, and/or the like).

As shown in FIG. 1B, and by reference number 120, the security monitoring platform may obtain, from the set of cloud applications, data that relates to current access rights assigned to a user. For example, the security monitoring platform may obtain the data that relates to the current access rights assigned to the user based on a request to evaluate the access rights assigned to that user, as part of an audit procedure to evaluate the access rights assigned to different users and detect potentially anomalous conditions, based on the user attempting to access a particular resource (e.g., a data object having a high sensitivity level), and/or the like.

As further shown in FIG. 1B, and by reference number 125, the security monitoring platform may determine a probability score for the current access rights assigned to the user based on the access rights data model that was generated and trained using the combination of unsupervised and supervised machine learning techniques, as described in further detail above. For example, in some implementations, the security monitoring platform may determine a set of features that relate to the user (e.g., a job title, clearance level, employment status, and/or the like), which may be input to the access rights data model to predict an access level, set of permissions, and/or the like that maps to the set of features that relate to the user. Accordingly, the security monitoring platform may compare the current access rights assigned to the user and the access level, the set of permissions, and/or the like that is predicted using the access rights data model, and the probability score may represent a probability that the current access rights assigned to the user are correct. For example, if the user is associated with various attributes or features that are consistent with a restricted access level (e.g., read-only access, unauthorized access) but the user has a critical access level that provides unrestricted access, the probability score may have a low value to indicate that the access level assigned to the user may need to be revoked or revised. In contrast, if the user is associated with various attributes or features that are consistent with the critical access level (e.g., a system administrator role, a high clearance level, and/or the like) or the permissions assigned to the user are limited to the restricted access level, the probability score may have a high value to indicate that the access level assigned to the user is likely correct.

As further shown in FIG. 1B, and by reference number 130, the security monitoring platform may perform an action related to the current access rights assigned to the user based on the probability score. For example, in some implementations, the action may include maintaining the current access rights based on the probability score satisfying a threshold that indicates that the current access level is likely correct (e.g., the current access level is consistent with a predicted access level that the access rights data model maps to a set of attributes or features associated with the user). In other examples, the action may include revoking or elevating the current access rights assigned to the user based on the probability score satisfying a threshold that indicates that the current access level is likely incorrect (e.g., the current access level is inconsistent with the predicted access level that the access rights data model maps to the set of attributes or features associated with the user). For example, where the access rights data model maps the set of attributes or features associated with the user to a restricted or limited access level and the probability score indicates that the current access level is likely incorrect, the action may include revoking or revising the current access rights assigned to the user. In another example, where the access rights data model maps the set of attributes or features associated with the user to a critical (e.g., unrestricted) access level and the probability score indicates that the current access level is likely incorrect, the action may include elevating the current access rights assigned to the user to another profile with a greater level of access.

In some implementations, the probability scores that are determined using the access rights data model may generally be dependent upon a particular time or environmental state that existed at a time that the access rights data model was trained. For example, in some cases, access control policies that affect user access rights within the cloud applications may change from time to time, and these policy changes may lack a basis in the historical data that was used to train the access rights data model. In other examples, the status associated with a particular user may change (e.g., an employee may leave an organization, be promoted to another position with a higher clearance level, and/or the like), the status associated with a particular resource may change (e.g., certain classified or confidential data may be declassified), and/or the like.

Accordingly, in some implementations, the security monitoring platform may employ one or more reinforcement learning techniques to update (e.g., re-train) the access rights data model to account for policy changes and/or other state changes that may affect user access rights within the cloud applications. In particular, whereas the unsupervised and supervised machine learning techniques are used to perform training based on patterns in existing data, the reinforcement learning technique(s) may be used to handle exceptions where actions are taken based on experience in the absence of data or a change in environment, which enables the security monitoring platform to make a decision to perform an action, receive feedback on the action, and learn from the feedback to make better decisions in the future. In other words, as the security monitoring platform performs actions to maintain, revoke, elevate, or otherwise revise user access rights based on the trained access rights data model over time, the reinforcement learning techniques enable the security monitoring platform to perform self-learning through feedback data that rewards or penalizes the actions that are performed based on whether the feedback data indicates that the actions were correct or incorrect.

Accordingly, as shown in FIG. 1C, and by reference number 135, the security monitoring platform may receive, from a client device, feedback regarding an outcome from the action that was performed in relation to the current access rights assigned to the user. For example, the client device may be operated by an administrator or other user authorized to apply changes to the user access rights within the cloud applications, and information related to the action performed by the security monitoring platform may be communicated to the client device to enable manual intervention and/or human oversight over the actions performed by the security monitoring platform. Accordingly, the information related to the action performed by the security monitoring platform may be displayed on the client device (e.g., in a dashboard or other interface that indicates the action that was performed, the attributes or features that were the basis of the action, the probability score on which the action was based, and/or the like). Accordingly, the user operating the client device may review the action that was performed to maintain, revoke, elevate, modify, and/or revise the current access rights assigned to the user, and the user may provide feedback by approving, rejecting, or revising the action. Additionally, or alternatively, the security monitoring platform may receive one or more user-defined rules from the client device (e.g., to define certain access control policies, access levels, and/or the like), and the one or more user-defined rules may be used in combination with the probability score described in more detail elsewhere herein to determine the action to be performed in relation to the current access rights assigned to one or more users.

As further shown in FIG. 1C, and by reference number 140, the security monitoring platform may apply the one or more reinforcement learning techniques to update the access rights data model based on the feedback received from the client device. For example, in some implementations, the reinforcement learning technique(s) may include a deep Q-network (DQN) learning technique, a Q-learning technique, a Markov decision process (MDP), and/or the like. In some implementations, the reinforcement learning technique may be based on a lookup table (e.g., a Q-table) that includes a set of possible states and a set of actions that are possible for each state. For example, the set of possible states may correspond to a mapping between a set of features and a particular access level and/or the like, and the set of actions may include maintaining, revising, revoking, elevating, and/or modifying the access level.

Accordingly, each column in the lookup table may correspond to a particular action, each row in the lookup table may correspond to a particular state, and each entry in the lookup table may correspond to a state-action pair that is initialized with a particular score, which may be refined as the security monitoring platform performs actions and receives feedback on the actions based on an exploration and exploitation technique. For example, when applying the exploration and exploitation technique, the security monitoring platform may determine whether to perform an exploration to gather more information across a possible search space (e.g., performing actions that are chosen to solicit feedback regarding unexplored state-action pairs) or to perform an exploitation to make an optimal decision given current information that is known within the search space. The reinforcement learning technique may have a goal to use the exploration and exploitation technique to maximize the score for a given state-action pair, which may enable the security monitoring platform to learn from the feedback and make better decisions in the future.

For example, a state-action pair in the lookup table may be initialized based on a score that represents the probability that the current access level assigned to the at least one user is correct and the exploration and exploitation technique to update the score associated with the state-action pair based on the feedback by applying a reward (e.g., to increase the score) based on the feedback indicating that the modification to the current access level is approved or by applying a penalty (e.g., to decrease the score) based on the feedback indicating that the modification to the current access level is revised or rejected. In this way, the reinforcement learning technique may be applied to update the mapping function associated with the access rights data model based on state changes (e.g., changes to access control policies) that affect user access rights associated with the cloud applications, based on new knowledge about the relationship between user attributes and access levels (e.g., which attributes should be given more or less weight), and/or the like. In this way, updating the mapping function using the reinforcement learning technique improves the accuracy of future predictions as to whether to modify or maintain the access rights that are assigned to users, conserves various resources that would otherwise be wasted by performing actions that may subsequently need to be rejected or revised, improves security by ensuring that user have a correct access level, and/or the like.

As indicated above, FIGS. 1A-1C are provided merely as one or more examples. Other examples may differ from what is described with regard to FIGS. 1A-1C.

Figure 2:
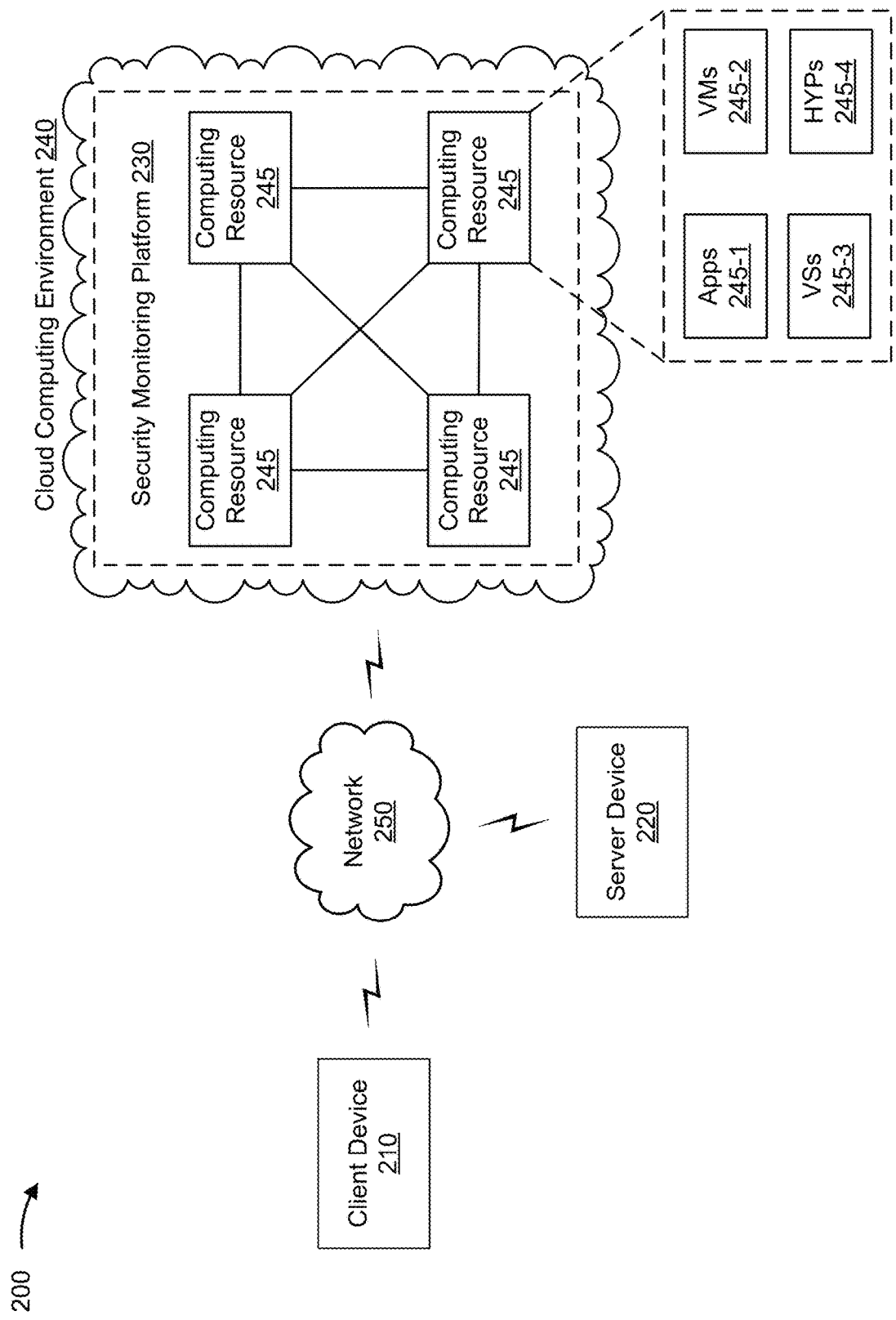
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a server device 220, a security monitoring platform 230 hosted within a cloud computing environment 240 that includes a set of computing resources 245, and a network 250. Devices of environment 200 may interconnect via wired connections, wireless connections, or a combination of wired and wireless connections.

Client device 210 includes one or more devices capable of receiving, generating, storing, processing, analyzing, and/or providing information associated with user access rights within one or more cloud applications. For example, client device 210 can include a computer (e.g., a desktop computer, a laptop computer, a tablet computer, a handheld computer, a server device, and/or the like), a mobile phone (e.g., a smart phone, a radiotelephone, and/or the like), an internet of things (IoT) device or smart appliance, a personal navigation device, or a similar device. In some implementations, client device 210 can receive information from and/or transmit information to server device 220, security monitoring platform 230, and/or the like. For example, client device 210 can be used to display information related to one or more actions that security monitoring platform 230 initiated to maintain, revoke, elevate, or otherwise modify access rights assigned to a particular user and provide feedback to security monitoring platform 230 indicating whether the one or more actions were correct.

Server device 220 includes one or more devices capable of receiving, generating storing, processing, and/or providing information associated with one or more cloud applications. For example, server device 220 may include a server (e.g., in a data center or a cloud computing environment), a data center (e.g., a multi-server micro datacenter), a workstation computer, a virtual machine (VM) provided in a cloud computing environment, and/or a similar type of device. In some implementations, server device 220 may include a communication interface that allows server device 220 to receive information from and/or transmit information to other devices in environment 200. In some implementations, server device 220 may be a physical device implemented within a housing, such as a chassis. In some implementations, server device 220 may be a virtual device implemented by one or more computer devices of a cloud computing environment or a data center. In some implementations, server device 220 may host one or more cloud applications and provide, to security monitoring platform 230, data that relates to user attributes, permissions, and/or the like within the one or more cloud applications.

Security monitoring platform 230 includes one or more devices capable of receiving, generating, storing, processing, and/or providing information associated with user access rights within one or more cloud applications. For example, security monitoring platform 230 may include a cloud server or a group of cloud servers. In some implementations, security monitoring platform 230 may be designed to be modular such that certain software components can be swapped in or out depending on a particular need. As such, security monitoring platform 230 may be easily and/or quickly reconfigured for different uses.

In some implementations, security monitoring platform 230 may receive, from server device 220, historical data that relates to user access rights associated with multiple cloud applications and use an unsupervised machine learning technique to cluster the historical data based on features included in the historical data that relate to permissions and attributes associated with multiple users within the multiple cloud applications. Furthermore, security monitoring platform 230 may use a supervised machine learning technique to train an access rights data model based on the clustered historical data and perform one or more actions that relate to current access rights assigned to at least one user within one or more of the multiple cloud applications based on a score that represents a probability that an access level assigned to the at least one user within the one or more of the multiple cloud applications is correct. Furthermore, in some implementations, security monitoring platform 230 may receive data providing feedback on the one or more actions from client device 210 and use the feedback to apply a reinforcement learning technique to update the access rights data model.

In some implementations, as shown in FIG. 2, security monitoring platform 230 can be hosted in a cloud computing environment 240. Notably, while implementations described herein describe security monitoring platform 230 as being hosted in cloud computing environment 240, in some implementations, security monitoring platform 230 can be non-cloud-based (e.g., can be implemented outside of a cloud computing environment) or partially cloud-based.

Cloud computing environment 240 includes an environment that hosts security monitoring platform 230. Cloud computing environment 240 can provide computation, software, data access, storage, and/or other services that do not require end-user knowledge of a physical location and configuration of system(s) and/or device(s) that host security monitoring platform 230. As shown, cloud computing environment 240 can include a group of computing resources 245 (referred to collectively as "computing resources 245" and individually as "computing resource 245").

Computing resource 245 includes one or more personal computers, workstation computers, server devices, or other types of computation and/or communication devices. In some implementations, computing resource 245 can host security monitoring platform 230. The cloud resources can include compute instances executing in computing resource 245, storage devices provided in computing resource 245, data transfer devices provided by computing resource 245, and/or the like. In some implementations, computing resource 245 can communicate with other computing resources 245 via wired connections, wireless connections, or a combination of wired and wireless connections.

As further shown in FIG. 2, computing resource 245 includes a group of cloud resources, such as one or more applications ("APPs") 245-1, one or more virtual machines ("VMs") 245-2, virtualized storage ("VSs") 245-3, one or more hypervisors ("HYPs") 245-4, and/or the like.

Application 245-1 includes one or more software applications that can be provided to or accessed by client device 210, server device 220, and/or the like. Application 245-1 can eliminate a need to install and execute the software applications on client device 210, server device 220, and/or the like. For example, application 245-1 can include software associated with security monitoring platform 230 and/or any other software capable of being provided via cloud computing environment 240. In some implementations, one application 245-1 can send information to and/or receive information from one or more other applications 245-1, via virtual machine 245-2.

Virtual machine 245-2 includes a software implementation of a machine (e.g., a computer) that executes programs like a physical machine. Virtual machine 245-2 can be either a system virtual machine or a process virtual machine, depending upon use and degree of correspondence to any real machine by virtual machine 245-2. A system virtual machine can provide a complete system platform that supports execution of a complete operating system ("OS"). A process virtual machine can execute a single program, and can support a single process. In some implementations, virtual machine 245-2 can execute on behalf of a user (e.g., a user of client device 210, server device 220, and/or the like), and can manage infrastructure of cloud computing environment 240, such as data management, synchronization, or long-duration data transfers.

Virtualized storage 245-3 includes one or more storage systems and/or one or more devices that use virtualization techniques within the storage systems or devices of computing resource 245. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can provide administrators of the storage system with flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 245-4 can provide hardware virtualization techniques that allow multiple operating systems (e.g., "guest operating systems") to execute concurrently on a host computer, such as computing resource 245. Hypervisor 245-4 can present a virtual operating platform to the guest operating systems, and can manage the execution of the guest operating systems. Multiple instances of a variety of operating systems can share virtualized hardware resources.

Network 250 includes one or more wired and/or wireless networks. For example, network 250 can include a cellular network (e.g., a long-term evolution (LTE) network, a code division multiple access (CDMA) network, a 3G network, a 4G network, a 5G network, another type of next generation network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, a core network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
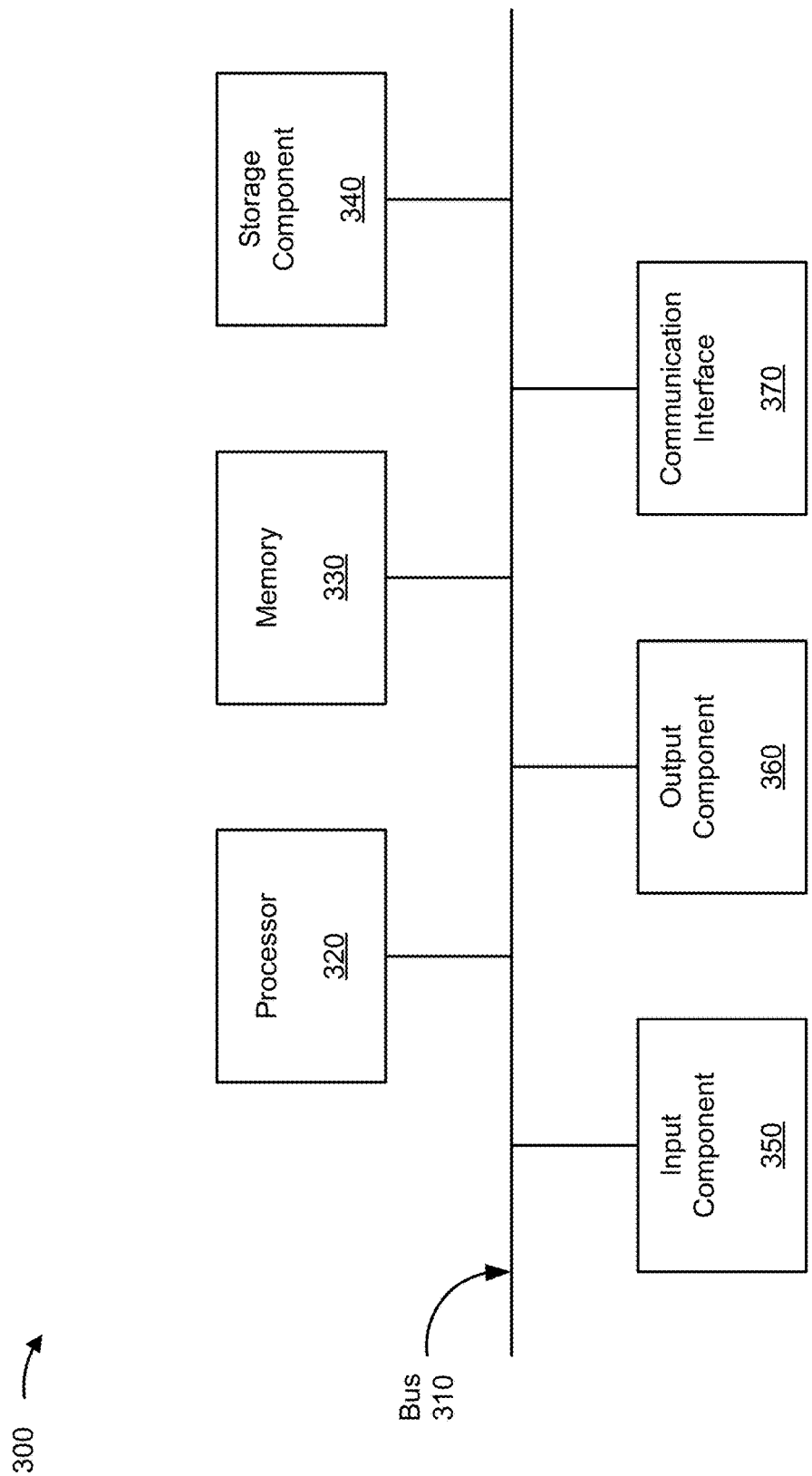
FIG. 3 is a diagram of example components of one or more devices of FIG. 2.

FIG. 3 is a diagram of example components of a device 300. Device 300 may correspond to client device 210, server device 220, security monitoring platform 230, computing resource 245, and/or the like. In some implementations, client device 210, server device 220, security monitoring platform 230, and/or computing resource 245 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among multiple components of device 300. Processor 320 is implemented in hardware, firmware, and/or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
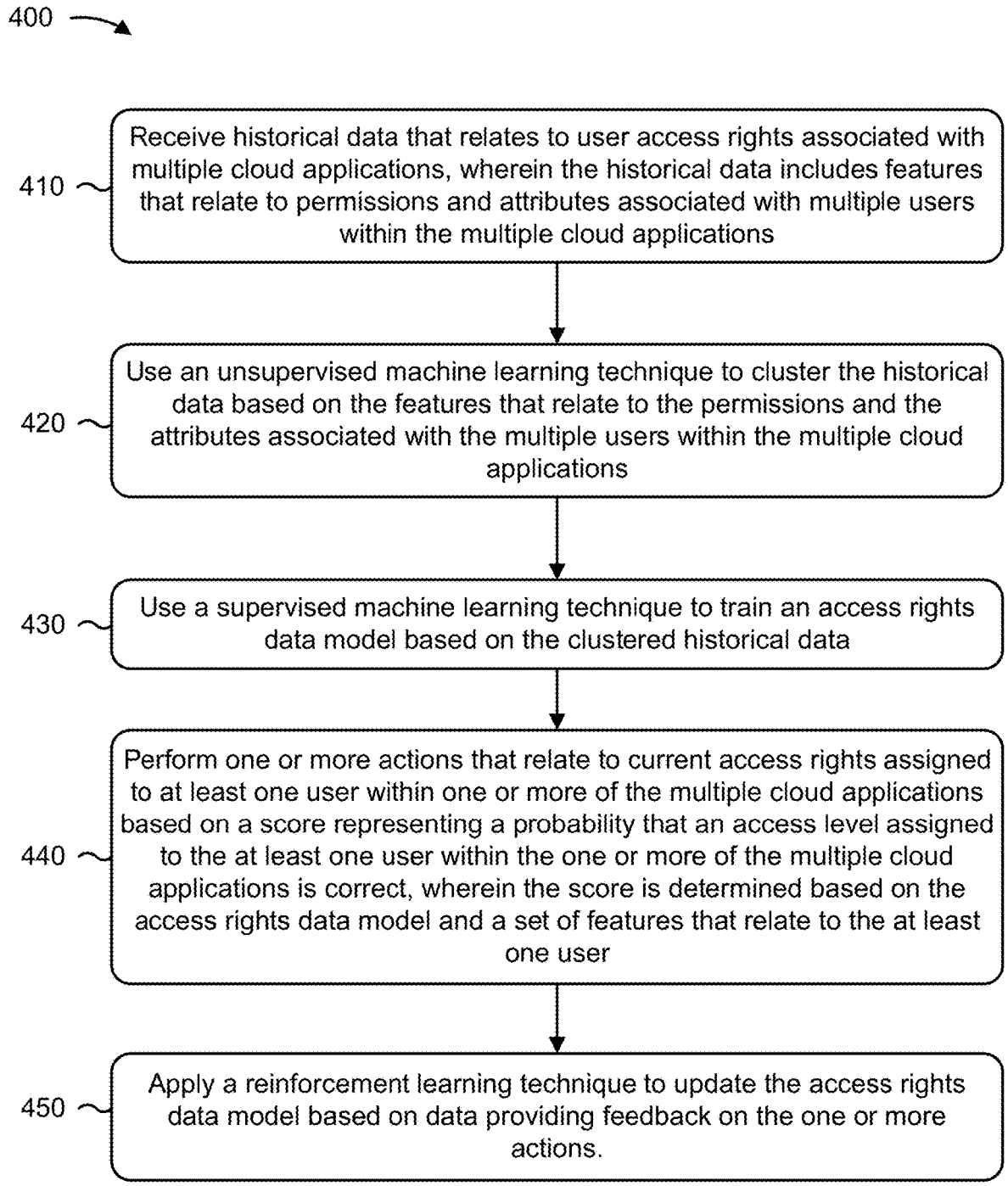
FIGS. 4-6 are flowcharts of example processes for managing access rights associated with cloud applications.

FIG. 4 is a flow chart of an example process 400 for managing access rights associated with cloud applications. In some implementations, one or more process blocks of FIG. 4 may be performed by a security monitoring platform (e.g., security monitoring platform 230). In some implementations, one or more process blocks of FIG. 4 may be performed by another device or a group of devices separate from or including the security monitoring platform, such as a client device (e.g., client device 210), a server device (e.g., server device 220), and/or the like.

As shown in FIG. 4, process 400 may include receiving historical data that relates to user access rights associated with multiple cloud applications, wherein the historical data includes features that relate to permissions and attributes associated with multiple users within the multiple cloud applications (block 410). For example, the security monitoring platform (e.g., using computing resource 245, processor 320, memory 330, storage component 340, input component 350, output component 360, communication interface 370, and/or the like) may receive historical data that relates to user access rights associated with multiple cloud applications, as described above. In some implementations, the historical data includes features that relate to permissions and attributes associated with multiple users within the multiple cloud applications.

As further shown in FIG. 4, process 400 may include using an unsupervised machine learning technique to cluster the historical data based on the features that relate to the permissions and the attributes associated with the multiple users within the multiple cloud applications (block 420). For example, the security monitoring platform (e.g., using computing resource 245, processor 320, memory 330, storage component 340, input component 350, output component 360, communication interface 370, and/or the like) may use an unsupervised machine learning technique to cluster the historical data based on the features that relate to the permissions and the attributes associated with the multiple users within the multiple cloud applications, as described above.

As further shown in FIG. 4, process 400 may include using a supervised machine learning technique to train an access rights data model based on the clustered historical data (block 430). For example, the security monitoring platform (e.g., using computing resource 245, processor 320, memory 330, storage component 340, input component 350, output component 360, communication interface 370, and/or the like) may use a supervised machine learning technique to train an access rights data model based on the clustered historical data, as described above.

As further shown in FIG. 4, process 400 may include performing one or more actions that relate to current access rights assigned to at least one user within one or more of the multiple cloud applications based on a score representing a probability that an access level assigned to the at least one user within the one or more of the multiple cloud applications is correct, wherein the score is determined based on the access rights data model and a set of features that relate to the at least one user (block 440). For example, the security monitoring platform (e.g., using computing resource 245, processor 320, memory 330, storage component 340, input component 350, output component 360, communication interface 370, and/or the like) may perform one or more actions that relate to current access rights assigned to at least one user within one or more of the multiple cloud applications based on a score representing a probability that an access level assigned to the at least one user within the one or more of the multiple cloud applications is correct, as described above. In some implementations, the score is determined based on the access rights data model and a set of features that relate to the at least one user.

As further shown in FIG. 4, process 400 may include applying a reinforcement learning technique to update the access rights data model based on data providing feedback on the one or more actions (block 450). For example, the security monitoring platform (e.g., using computing resource 245, processor 320, memory 330, storage component 340, input component 350, output component 360, communication interface 370, and/or the like) may apply a reinforcement learning technique to update the access rights data model based on data providing feedback on the one or more actions, as described above.

Process 400 may include additional implementations, such as any single implementation or any combination of implementations described below and/or in connection with one or more other processes described elsewhere herein.

In a first implementation, the one or more actions include at least one of revoking, elevating, or maintaining the current access rights assigned to the at least one user.

In a second implementation, alone or in combination with the first implementation, the unsupervised machine learning technique includes a k-means clustering technique used to assign each of the features included in the historical data to one of multiple clusters with a nearest mean.

In a third implementation, alone or in combination with one or more of the first and second implementations, the supervised machine learning technique includes a naïve Bayes classification technique that approximates a mapping function from the features included in the historical data to the multiple clusters.

In a fourth implementation, alone or in combination with one or more of the first through third implementations, the reinforcement learning technique is applied to update the mapping function based on one or more state changes that affect the user access rights associated with the multiple cloud applications.

In a fifth implementation, alone or in combination with one or more of the first through fourth implementations, the unsupervised machine learning technique comprises a decision tree model.

In a sixth implementation, alone or in combination with one or more of the first through fifth implementations, the access rights data model comprises a linear regression model.

In a seventh implementation, alone or in combination with one or more of the first through sixth implementations, the security monitoring platform may receive one or more user-defined rules, and the one or more actions may be performed based on the score and based on the one or more user-defined rules.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
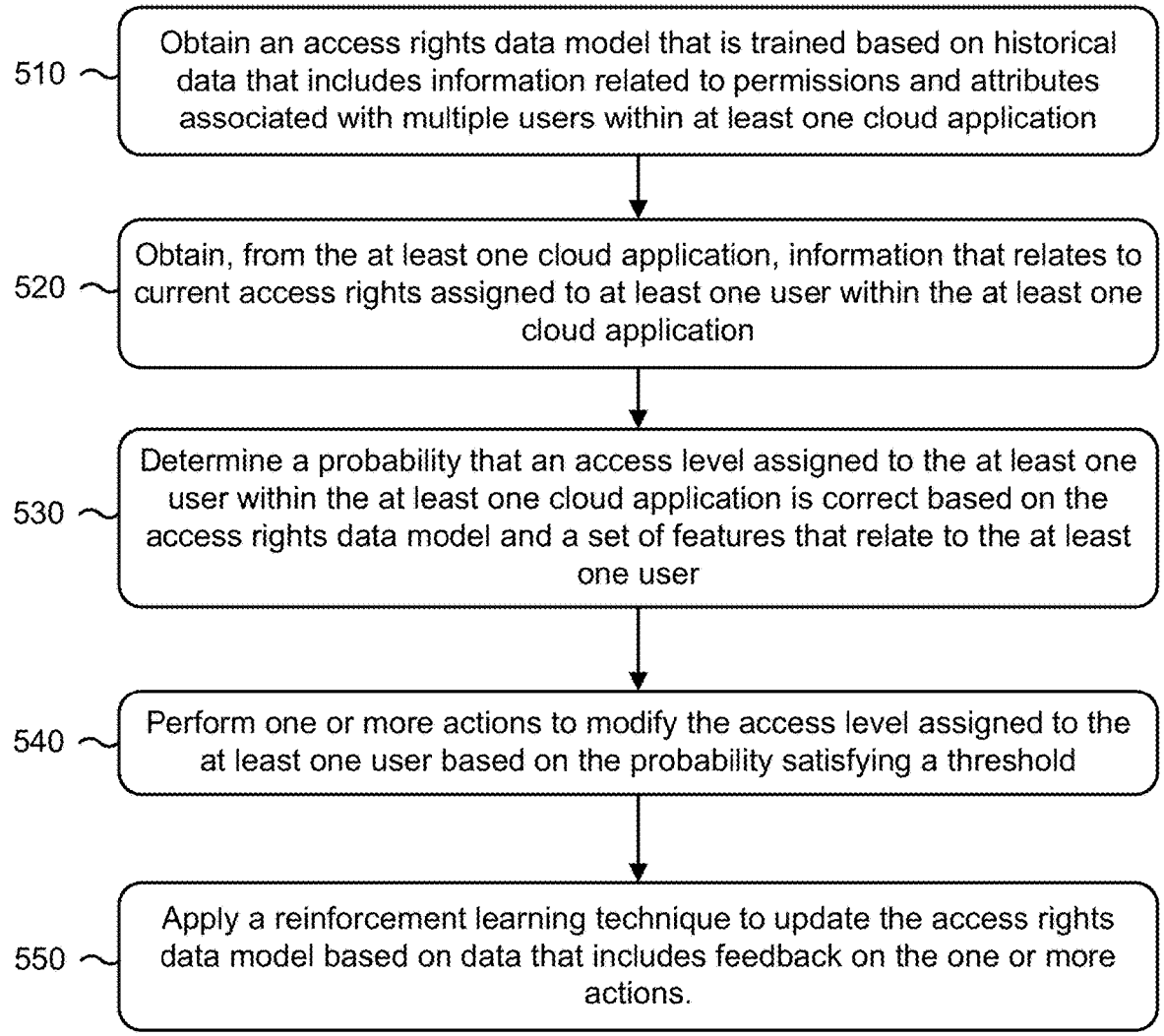

FIG. 5 is a flow chart of an example process 500 for managing access rights associated with cloud applications. In some implementations, one or more process blocks of FIG. 5 may be performed by a security monitoring platform (e.g., security monitoring platform 230). In some implementations, one or more process blocks of FIG. 5 may be performed by another device or a group of devices separate from or including the security monitoring platform, such as a client device (e.g., client device 210), a server device (e.g., server device 220), and/or the like.

As shown in FIG. 5, process 500 may include obtaining an access rights data model that is trained based on historical data that includes information related to permissions and attributes associated with multiple users within at least one cloud application (block 510). For example, the security monitoring platform (e.g., using computing resource 245, processor 320, memory 330, storage component 340, input component 350, output component 360, communication interface 370, and/or the like) may obtain an access rights data model that is trained based on historical data that includes information related to permissions and attributes associated with multiple users within at least one cloud application, as described above.

As further shown in FIG. 5, process 500 may include obtaining, from the at least one cloud application, information that relates to current access rights assigned to at least one user within the at least one cloud application (block 520). For example, the security monitoring platform (e.g., using computing resource 245, processor 320, memory 330, storage component 340, input component 350, output component 360, communication interface 370, and/or the like) may obtain, from the at least one cloud application, information that relates to current access rights assigned to at least one user within the at least one cloud application, as described above.

As further shown in FIG. 5, process 500 may include determining a probability that an access level assigned to the at least one user within the at least one cloud application is correct based on the access rights data model and a set of features that relate to the at least one user (block 530). For example, the security monitoring platform (e.g., using computing resource 245, processor 320, memory 330, storage component 340, input component 350, output component 360, communication interface 370, and/or the like) may determine a probability that an access level assigned to the at least one user within the at least one cloud application is correct based on the access rights data model and a set of features that relate to the at least one user, as described above.

As further shown in FIG. 5, process 500 may include performing one or more actions to modify the access level assigned to the at least one user based on the probability satisfying a threshold (block 540). For example, the security monitoring platform (e.g., using computing resource 245, processor 320, memory 330, storage component 340, input component 350, output component 360, communication interface 370, and/or the like) may perform one or more actions to modify the access level assigned to the at least one user based on the probability satisfying a threshold, as described above.

As further shown in FIG. 5, process 500 may include applying a reinforcement learning technique to update the access rights data model based on data that includes feedback on the one or more actions (block 550). For example, the security monitoring platform (e.g., using computing resource 245, processor 320, memory 330, storage component 340, input component 350, output component 360, communication interface 370, and/or the like) may apply a reinforcement learning technique to update the access rights data model based on data that includes feedback on the one or more actions, as described above.

Process 500 may include additional implementations, such as any single implementation or any combination of implementations described below and/or in connection with one or more other processes described elsewhere herein.

In a first implementation, the one or more actions include at least one of revoking or elevating the access level assigned to the at least one user.

In a second implementation, alone or in combination with the first implementation, the security monitoring platform may obtain the historical data from the at least one cloud application, transform the historical data obtained from the at least one cloud application into a tabular format that represents the permissions and attributes associated with the multiple users according to one or more feature sets, and partition the one or more feature sets into multiple clusters using an unsupervised machine learning technique.

In a third implementation, alone or in combination with one or more of the first and second implementations, the access rights data model is trained based further on a supervised machine learning technique that approximates a mapping function from the one or more feature sets to the multiple clusters.

In a fourth implementation, alone or in combination with one or more of the first through third implementations, the historical data obtained from the at least one cloud application is encrypted using a public key associated with the device. In some implementations, the security monitoring platform may decrypt the historical data using a private key associated with the device prior to transforming the historical data into the tabular format.

In a fifth implementation, alone or in combination with one or more of the first through fourth implementations, the reinforcement learning technique is to be applied to update the access rights data model based on changes to one or more access control policies that affect user access rights associated with the at least one cloud application.

In a sixth implementation, alone or in combination with one or more of the first through fifth implementations, when applying the reinforcement learning technique, the security monitoring platform may initialize a state-action pair in a Q-table based on a score that represents the probability that the access level assigned to the at least one user is correct and use an exploration and exploitation technique to update the score associated with the state-action pair based on the data that includes the feedback on the one or more actions.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
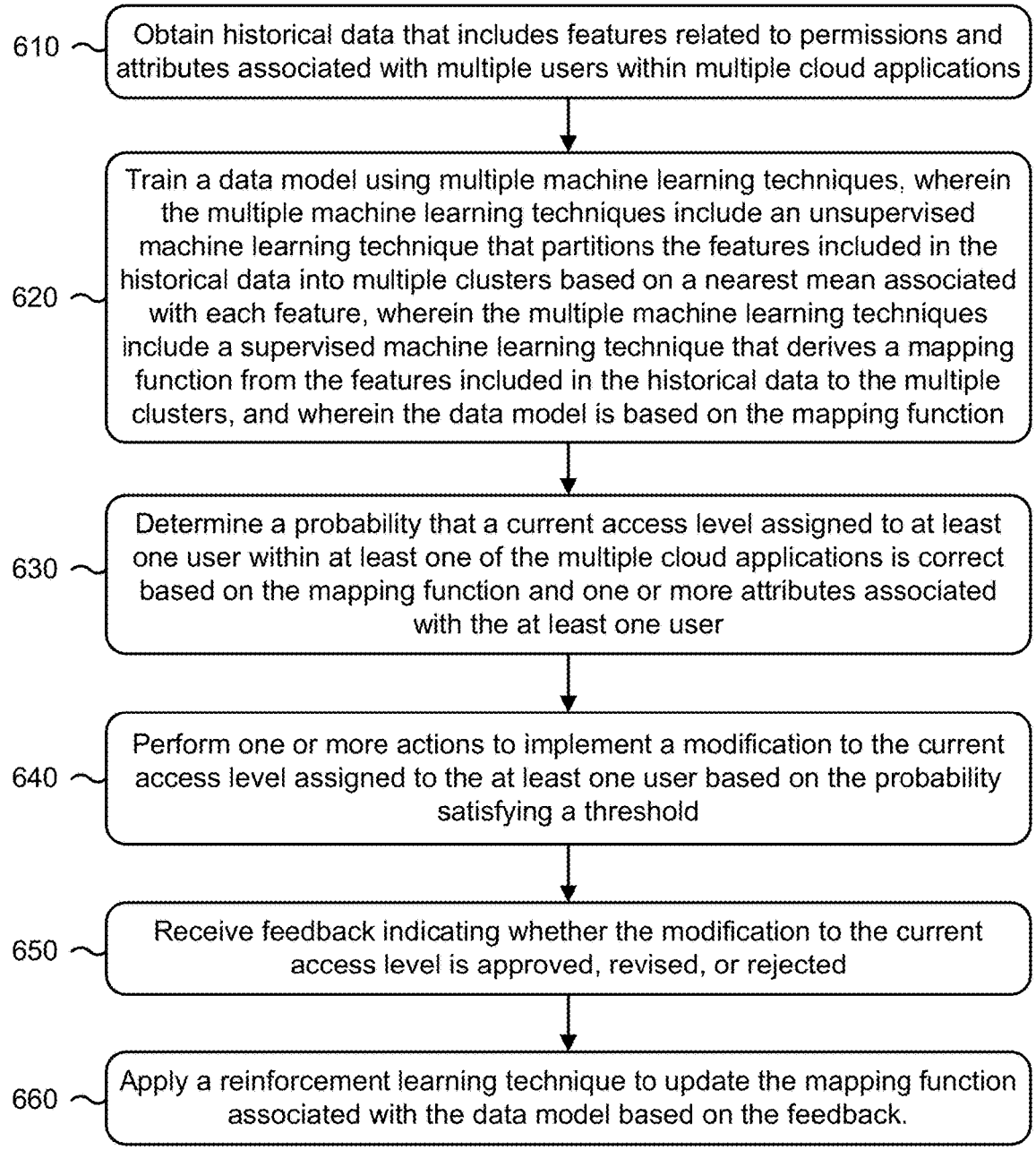

FIG. 6 is a flow chart of an example process 600 for managing access rights associated with cloud applications. In some implementations, one or more process blocks of FIG. 6 may be performed by a security monitoring platform (e.g., security monitoring platform 230). In some implementations, one or more process blocks of FIG. 6 may be performed by another device or a group of devices separate from or including the security monitoring platform, such as a client device (e.g., client device 210), a server device (e.g., server device 220), and/or the like.

As shown in FIG. 6, process 600 may include obtaining historical data that includes features related to permissions and attributes associated with multiple users within multiple cloud applications (block 610). For example, the security monitoring platform (e.g., using computing resource 245, processor 320, memory 330, storage component 340, input component 350, output component 360, communication interface 370, and/or the like) may obtain historical data that includes features related to permissions and attributes associated with multiple users within multiple cloud applications, as described above.

As further shown in FIG. 6, process 600 may include training a data model using multiple machine learning techniques, wherein the multiple machine learning techniques include an unsupervised machine learning technique that partitions the features included in the historical data into multiple clusters based on a nearest mean associated with each feature, wherein the multiple machine learning techniques include a supervised machine learning technique that derives a mapping function from the features included in the historical data to the multiple clusters, and wherein the data model is based on the mapping function (block 620). For example, the security monitoring platform (e.g., using computing resource 245, processor 320, memory 330, storage component 340, input component 350, output component 360, communication interface 370, and/or the like) may train a data model using multiple machine learning techniques, as described above. In some implementations, the multiple machine learning techniques include an unsupervised machine learning technique that partitions the features included in the historical data into multiple clusters based on a nearest mean associated with each feature. In some implementations, the multiple machine learning techniques include a supervised machine learning technique that derives a mapping function from the features included in the historical data to the multiple clusters. In some implementations, the data model is based on the mapping function.

As further shown in FIG. 6, process 600 may include determining a probability that a current access level assigned to at least one user within at least one of the multiple cloud applications is correct based on the mapping function and one or more attributes associated with the at least one user (block 630). For example, the security monitoring platform (e.g., using computing resource 245, processor 320, memory 330, storage component 340, input component 350, output component 360, communication interface 370, and/or the like) may determine a probability that a current access level assigned to at least one user within at least one of the multiple cloud applications is correct based on the mapping function and one or more attributes associated with the at least one user, as described above.

As further shown in FIG. 6, process 600 may include performing one or more actions to implement a modification to the current access level assigned to the at least one user based on the probability satisfying a threshold (block 640). For example, the security monitoring platform (e.g., using computing resource 245, processor 320, memory 330, storage component 340, input component 350, output component 360, communication interface 370, and/or the like) may perform one or more actions to implement a modification to the current access level assigned to the at least one user based on the probability satisfying a threshold, as described above.

As further shown in FIG. 6, process 600 may include receiving feedback indicating whether the modification to the current access level is approved, revised, or rejected (block 650).

For example, the security monitoring platform (e.g., using computing resource 245, processor 320, memory 330, storage component 340, input component 350, output component 360, communication interface 370, and/or the like) may receive feedback indicating whether the modification to the current access level is approved, revised, or rejected, as described above.

As further shown in FIG. 6, process 600 may include applying a reinforcement learning technique to update the mapping function associated with the data model based on the feedback (block 660). For example, the security monitoring platform (e.g., using computing resource 245, processor 320, memory 330, storage component 340, input component 350, output component 360, communication interface 370, and/or the like) may apply a reinforcement learning technique to update the mapping function associated with the data model based on the feedback, as described above.

Process 600 may include additional implementations, such as any single implementation or any combination of implementations described below and/or in connection with one or more other processes described elsewhere herein.

In a first implementation, the reinforcement learning technique is applied to update the mapping function based on one or more state changes that affect user access rights associated with the multiple cloud applications.

In a second implementation, alone or in combination with the first implementation, when applying the reinforcement learning technique, the security monitoring platform may initialize a state-action pair in a Q-table based on a score that represents the probability that the current access level assigned to the at least one user is correct and use an exploration and exploitation technique to update the score associated with the state-action pair based on the feedback.

In a third implementation, alone or in combination with one or more of the first and second implementations, the reinforcement learning technique applies a reward based on the feedback indicating that the modification to the current access level is approved or a penalty based on the feedback indicating that the modification to the current access level is revised or rejected.

In a fourth implementation, alone or in combination with one or more of the first through third implementations, the feedback is provided by a user authorized to apply changes to the user access rights associated with the multiple cloud applications.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, and/or the like). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    receiving, by a device, historical data that relates to user access rights associated with multiple cloud applications,
        wherein the historical data includes features that relate to permissions and attributes associated with multiple users within the multiple cloud applications;
    using, by the device, an unsupervised machine learning technique to cluster the historical data based on the features that relate to the permissions and the attributes associated with the multiple users within the multiple cloud applications;
    using, by the device, a supervised machine learning technique to train an access rights data model based on the clustered historical data;
    performing, by the device, one or more actions that relate to current access rights assigned to at least one user within one or more of the multiple cloud applications based on a score representing a probability that an access level assigned to the at least one user within the one or more of the multiple cloud applications is correct,
        wherein the score is determined based on the access rights data model and a set of features that relate to the at least one user; and
    applying, by the device, a reinforcement learning technique to update the access rights data model based on data providing feedback on the one or more actions.

2. The method of claim 1, wherein the one or more actions include at least one of revoking, elevating, or maintaining the current access rights assigned to the at least one user.

3. The method of claim 1, wherein the unsupervised machine learning technique includes a k-means clustering technique used to assign each of the features included in the historical data to one of multiple clusters with a nearest mean.

4. The method of claim 3, wherein the supervised machine learning technique includes a naïve Bayes classification technique that approximates a mapping function from the features included in the historical data to the multiple clusters.

5. The method of claim 4, wherein the reinforcement learning technique is applied to update the mapping function based on one or more state changes that affect the user access rights associated with the multiple cloud applications.

6. The method of claim 1, wherein the unsupervised machine learning technique comprises a decision tree model.

7. The method of claim 1, wherein the access rights data model comprises a linear regression model.

8. The method of claim 1, further comprising:
receiving one or more user-defined rules,
wherein the one or more actions are performed based on the score and based on the one or more user-defined rules.

9. A device, comprising:
one or more memories; and
one or more processors, communicatively coupled to the one or more memories, configured to:
obtain an access rights data model that is trained based on historical data that includes information related to permissions and attributes associated with multiple users within at least one cloud application;
obtain, from the at least one cloud application, information that relates to current access rights assigned to at least one user within the at least one cloud application;
determine a probability that an access level assigned to the at least one user within the at least one cloud application is correct based on the access rights data model and a set of features that relate to the at least one user;
perform one or more actions to modify the access level assigned to the at least one user based on the probability satisfying a threshold; and
apply a reinforcement learning technique to update the access rights data model based on data that includes feedback on the one or more actions.

10. The device of claim 9, wherein the one or more actions include at least one of revoking or elevating the access level assigned to the at least one user.

11. The device of claim 9, wherein the one or more processors are further configured to:
obtain the historical data from the at least one cloud application;
transform the historical data obtained from the at least one cloud application into a tabular format that represents the permissions and attributes associated with the multiple users according to one or more feature sets; and
partition the one or more feature sets into multiple clusters using an unsupervised machine learning technique,
wherein the access rights data model is trained based on the multiple clusters.

12. The device of claim 11, wherein the access rights data model is trained based further on a supervised machine learning technique that approximates a mapping function from the one or more feature sets to the multiple clusters.

13. The device of claim 11, wherein the historical data obtained from the at least one cloud application is encrypted using a public key associated with the device, and
wherein the one or more processors are further configured to:
decrypt the historical data using a private key associated with the device prior to transforming the historical data into the tabular format.

14. The device of claim 9, wherein the reinforcement learning technique is to be applied to update the access rights data model based on changes to one or more access control policies that affect user access rights associated with the at least one cloud application.

15. The device of claim 9, wherein the one or more processors, when applying the reinforcement learning technique, are configured to:
initialize a state-action pair in a Q-table based on a score that represents the probability that the access level assigned to the at least one user is correct; and
use an exploration and exploitation technique to update the score associated with the state-action pair based on the data that includes the feedback on the one or more actions.

16. A non-transitory computer-readable medium storing instructions, the instructions comprising:
one or more instructions that, when executed by one or more processors, cause the one or more processors to:
obtain historical data that includes features related to permissions and attributes associated with multiple users within multiple cloud applications;
train a data model using multiple machine learning techniques,
wherein the multiple machine learning techniques include an unsupervised machine learning technique that partitions the features included in the historical data into multiple clusters based on a nearest mean associated with each feature,
wherein the multiple machine learning techniques include a supervised machine learning technique that derives a mapping function from the features included in the historical data to the multiple clusters, and
wherein the data model is based on the mapping function;
determine a probability that a current access level assigned to at least one user within at least one of the multiple cloud applications is correct based on the mapping function and one or more attributes associated with the at least one user;
perform one or more actions to implement a modification to the current access level assigned to the at least one user based on the probability satisfying a threshold;
receive feedback indicating whether the modification to the current access level is approved, revised, or rejected; and
apply a reinforcement learning technique to update the mapping function associated with the data model based on the feedback.

17. The non-transitory computer-readable medium of claim 16, wherein the reinforcement learning technique is applied to update the mapping function based on one or more state changes that affect user access rights associated with the multiple cloud applications.

18. The non-transitory computer-readable medium of claim 16, wherein the one or more instructions that cause the one or more processors to apply the reinforcement learning technique further cause the one or more processors to:
initialize a state-action pair in a Q-table based on a score that represents the probability that the current access level assigned to the at least one user is correct; and
use an exploration and exploitation technique to update the score associated with the state-action pair based on the feedback.

19. The non-transitory computer-readable medium of claim 16, wherein the reinforcement learning technique applies a reward based on the feedback indicating that the modification to the current access level is approved or a penalty based on the feedback indicating that the modification to the current access level is revised or rejected.

20. The non-transitory computer-readable medium of claim 16, wherein the feedback is provided by a user authorized to apply changes to user access rights associated with the multiple cloud applications.

* * * * *